(12) United States Patent
Koizumi et al.

(10) Patent No.: US 6,685,164 B1
(45) Date of Patent: Feb. 3, 2004

(54) CONTROL VALVE AND DIAPHRAGM FOR USE IN THE CONTROL VALVE

(75) Inventors: Masao Koizumi, Fuchu (JP); Koichi Ohashi, Fuchu (JP)

(73) Assignee: Hamai Industries Limited, Tokyo (JP)

( * ) Notice: Subject to any disclaimer, the term of this patent is extended or adjusted under 35 U.S.C. 154(b) by 85 days.

(21) Appl. No.: 09/659,444

(22) Filed: Sep. 11, 2000

(51) Int. Cl.[7] .................................................. F16K 7/00
(52) U.S. Cl. ........................ 251/331; 251/63.4; 92/99; 92/103 F
(58) Field of Search ............................... 251/63.4, 331, 251/61–61.5, 335.1, 335.2, 335.3, 129.17; 92/99, 100, 103 F

(56) References Cited

U.S. PATENT DOCUMENTS

| | | | |
|---|---|---|---|
| 3,349,795 A | * 10/1967 | Matsutani | 251/331 X |
| 4,903,939 A | * 2/1990 | Ariizumi et al. | 251/63.4 |
| 5,079,472 A | * 1/1992 | Uhl et al. | 310/332 |
| 5,127,430 A | * 7/1992 | Powers et al. | 251/331 X |
| 5,335,691 A | * 8/1994 | Kolenc | 251/331 X |
| 5,346,174 A | * 9/1994 | Harwath | 251/61.3 |
| 5,534,103 A | * 7/1996 | Yano et al. | 156/272.2 |
| 5,593,134 A | * 1/1997 | Steber et al. | 251/331 X |
| 5,628,411 A | * 5/1997 | Mills et al. | 251/368 X |
| 5,836,571 A | * 11/1998 | Streitman et al. | 251/331 |
| 6,026,836 A | * 2/2000 | Moenkhaus | 251/331 X |
| 6,074,178 A | * 6/2000 | Bishop et al. | 310/328 |
| 6,138,712 A | * 10/2000 | Hirose | 251/63.4 X |
| 6,142,062 A | * 11/2000 | Streitman | 92/103 F X |

FOREIGN PATENT DOCUMENTS

JP  7112330  5/1995

* cited by examiner

*Primary Examiner*—Gene Mancene
*Assistant Examiner*—Eric Keasel
(74) *Attorney, Agent, or Firm*—Norris McLaughlin & Marcus

(57) ABSTRACT

The control valve according to the present invention has a high durability, so that the valve is not easily damaged even in case that the valve is provided in a corrosion gas current path. The valve has a construction such that a diaphragm (4) is contained in the valve body (2), which has a valve chamber (23) between the gas current in path (25) and the gas current out path (26). The diaphragm 4 is urged against an opening (252) formed in the center of the valve seat 231 in the valve chamber (23) to open and close the opening. The valve has a valve control member (5), which has a clamping member (3) to clamp the diaphragm and is made to contact to the diaphragm from outside to open and close the opening. The diaphragm has an urging member (41) made of ceramic, which is fixed to the opening (252) side of the diaphragm so that the resistance to corrosion of the diaphragm is improved.

6 Claims, 6 Drawing Sheets

CONTROL VALVE AND DIAPHRAGM FOR USE IN THE CONTROL VALVE

BACKGROUND OF THE INVENTION (1) Field of the Invention

The present invention relates to a control valve for use by being attached to outlets of, for instance, a high-pressure gas container. Particularly, the present invention relates to a control valve and a diaphragm therefor for use in a gas container containing a corrosive gas.

(2) Related Art

A container for enclosing a gas, such as a gas cylinder for propane, has a gas control valve at the outlet thereof. By opening or closing the control valve, the gas enclosed in the container is discharged or sealed hermetically.

Such a conventional control valve is constituted of a valve body, a diaphragm, a fastening member to fix the diaphragm; a valve controlling member, and an operating device for the valve controlling member. Inside of the valve body, are formed a valve chamber wherein a valve member is contained and a valve seat therefor is formed, a gas inlet which has an opening in the center of a valve seat to be connected to the valve chamber, a valve seat in the center of which the opening of the gas inlet is provided, a gas outlet, and a cylindrical portion whose inside space is connected to the valve chamber. The diaphragm is arranged between said inside space of the cylindrical portion and the valve chamber, and the fastening member is threaded in the inside space of the cylindrical portion to fix the diaphragm against the valve body. The valve controlling member is inserted through the center of the fastening member to urge the diaphragm against the gas inlet provided in the valve seat.

By moving the valve controlling member back and forth with the operating device, the diaphragm is closed or opened to the valve seat to enclose or discharge the gas in or from the container.

In case, however, that a strong corrosive gas is enclosed in the container, the diaphragm is easily damaged and the durability thereof decreases due to the fact that the diaphragm is made to contact the gas. Even if a material having a high resistance to corrosion is used for the diaphragm, when the gas flows from the inlet to the valve chamber, the part of the diaphragm being in contact to the valve seat is directly subjected to the corrosive gas, so that this part is particularly apt to be corrosive.

Further, the part of the diaphragm is always made to contact the corrosive gas even when the valve is closed. Therefore, corrosion is caused there more frequently. When corrosion is caused partially in this manner, a stress is concentrated there so that cracking would be easily generated therefrom.

The present invention has its purpose to provide a control valve having a high durability and a diaphragm therefor, which are suitably used in a corrosive gas flow path.

SUMMARY OF THE INVENTION

A control valve according to the first invention comprises a gas current in path through which a gas flows in; a gas current out path through which the gas coming from said current in path goes out;

a valve chamber being provided between said current in path and said current out path, a valve body comprising a cylindrical portion having an inside space which is connected to said valve chamber;

a valve seat being provided in said valve chamber where an outlet of said gas current in path is open;

a diaphragm separating said valve chamber from said inside airspace of said cylindrical portion;

a clamp surface being provided in said valve body;

a clamping member being urged against said clamp surface to hold said diaphragm between said clamp surface and the member itself;

an urging member having a resistance to corrosion and being fixed to said diaphragm;

a valve control member being contained in a center of said clamping member in a movable condition in advance or retreat directions and urging said urging member of the diaphragm against said valve seat; and an operating means for controlling the movement of the valve control member in advance or retreat directions.

The present invention has another aspect that the urging member is made of ceramic.

The present invention has still another aspect that said diaphragm has a flexible portion by which a flexure thereof is absorbed.

The present invention has its second purpose to provide a diaphragm for use in a control valve used in a corrosive gas flow path, which comprises a thin plate member having a flexibility; and an urging member made of ceramic being fixed to the center portion of said thin plate member.

The second invention has another aspect that said diaphragm for use in a control valve has a concave flexible portion which is formed in a peripheral portion of an area where said urging member is fixed.

The second invention has another aspect that said diaphragm for use in a control valve comprises an inserting member made of metal being inserted between said thin plate member and said urging member.

The second invention has still another aspect that said urging member has a tapered surface.

DETAILED EXPLANATION OF THE PREFERRED EMBODIMENTS

Figure 1:
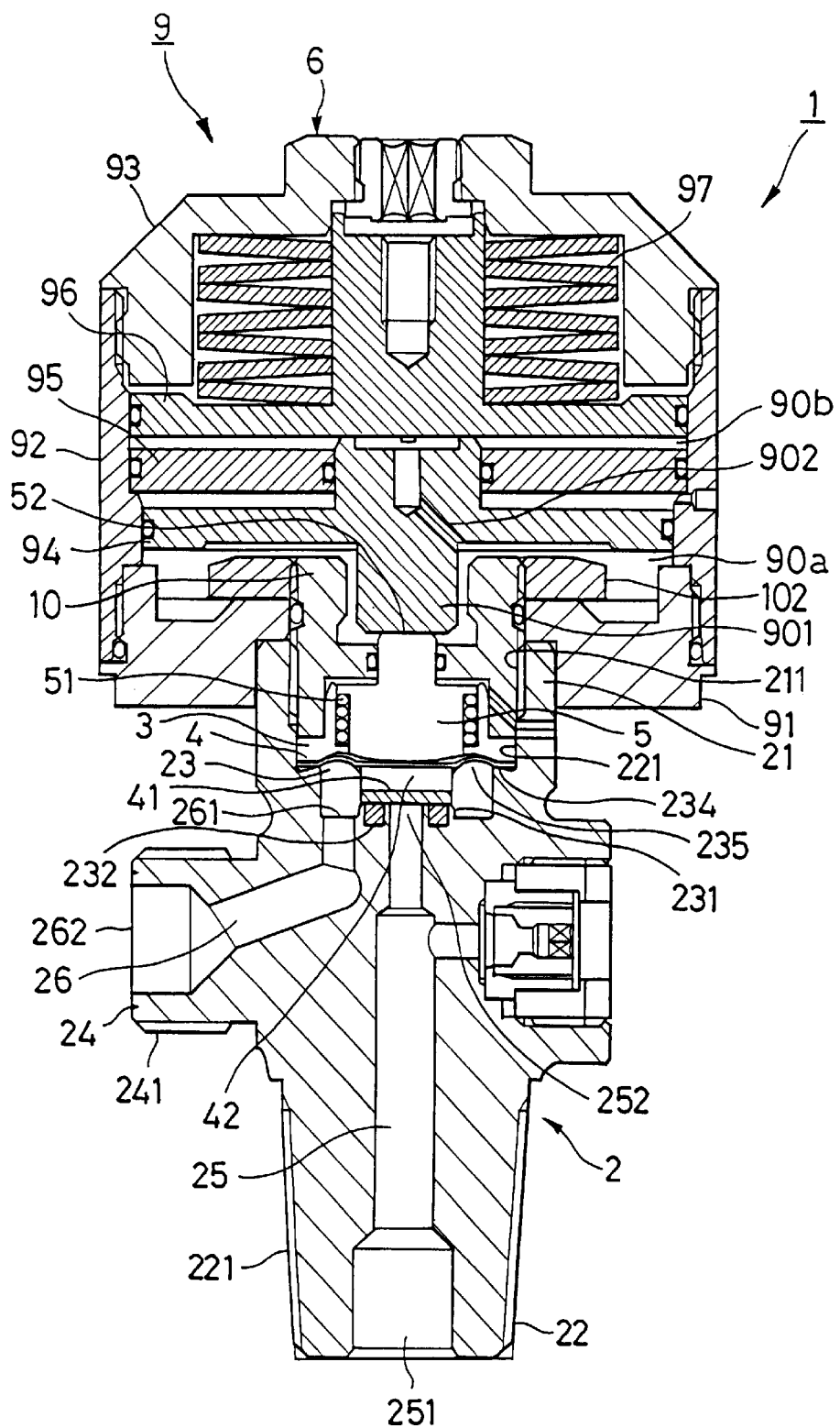
FIG. 1 is a cross-sectional view showing a construction of the control valve as a whole according to the first embodiment of the present invention.

The first embodiment of the control valve according to the present invention will be explained below, referring the attached drawings. A control valve 1 according to the first embodiment comprises a valve body 2, a clamping member 3, which is stored in a cylindrical portion 21 of the valve body 2, a diaphragm 4, a valve controlling member 5 which is inserted into a center portion of said clamping member 3, and a controlling member 9 for controlling said valve controlling member 5 in an advance or retreat direction. In this embodiment, the controlling member 9 is realized by an air actuator.

The valve body 2 has substantially a cylindrical shape, which comprises a fixing portion 22 provided at a lower portion thereof, a valve chamber 23 which has a valve seat 231, a cylindrical portion 21, which has an inner side air space 211 being connected to said valve chamber 23, a connecting portion 24 having a gas outlet 262 at a top end portion thereof, a gas current in path 25 through which a gas comes in, and a gas current out path 26 through which a gas goes out. The fixing portion 22 has one opening 251 of said gas current in path 25 at a top end portion thereof and a male thread 221 is provided on an outer surface of the fixing portion 22, so that a connector of an inlet of a gas container (not shown) can be connected.

The valve chamber 23, which has a cylindrical shape, is hollowed out of said valve body 2. At a bottom portion of the valve chamber 23, is provided a valve seat 231. On the peripheral end portion of the valve seat 231, an annular seal member 232 is embedded and at the center portion of the valve seat 231, another opening 252 of said gas current in path 25 is provided. Further, in the valve chamber 23, one opening 261 of said gas current out path 26 is provided.

On the peripheral portion of an opening of the valve chamber 23, a step portion is formed, where a clamp surface 234 is provided in a concentric manner in order to fix the peripheral portion of the diaphragm 4 in a clamped manner. On the upper portion of the clamp surface 234, is provided the cylindrical portion 21 into which said clamping member 3 is connected by means of threads. The air space 211 inside of the cylindrical portion 21 is connected to the valve chamber 23 via the opening 235, which is surrounded by the clamp surface 234. Into the inner space 21, the clamping member 10 is connected by means of screws. On the inner side of the cylindrical portion 21, a female thread 212 is formed. The fixing member 10 of the controlling means 9, which should be screwed into the cylindrical portion 21, clamps the diaphragm 4 via the clamping member 3.

The connecting portion 24 provided on the outer surface of the valve body 2 has a cylindrical shape, on the outer surface of which a male thread 241 is provided. On the top of the connecting portion 24, another opening 262 of the gas current out path 26 is provided. A terminal of other gas current path, such as a gas tube, is connected to the connecting portion 24.

The diaphragm 4 is constituted of a thin plate having a circular shape and is made of a metal material which has a resistance to corrosion. As a preferred metal material, for instance, Titanium, Inconel (TM: material composed of 80% of Ni and 14% of Cr and 8% of Fe), Stainless Steel, or an alloy such as Nickel-Cobalt is suggested. The diaphragm 4 is fixed between the clamp surface 234 and the clamping member 3 at its peripheral portion while keeping it airtight, and the center portion thereof is available to be bent in a vertical direction with respect to a plane surface of the diaphragm. On the center portion, a closure member 41 (also identified herein as 'urging member 41') for closing the opening 252 of the valve seat 231 is fixed via an intermediate member 42 (also identified as 'insertion member 42'). The urging member 41 is made of a material which has a higher resistance to corrosion in comparison to that of the material of the diaphragm. In this embodiment, the urging member 41 is made of ceramic material. As an alternative, a metal or an alloy on which a treatment of resistance to corrosion is provided also can be used. The ceramic material has non organic oxide as basic component, and should be a sintered body obtained by sintering the material at a high temperature. For instance, a fine ceramic such as an engineering ceramic can be preferably used.

A known bonding method can be used for bonding the ceramic material (urging member 41) to the metal diaphragm 4 or the metal inserting member 42. The method disclosed in the Japanese Preliminarily Patent Publication No. Hei7-112330 can be preferably used therefor, where a laser beam is made incident upon the surface of the ceramic to make the metal element of the ceramic component deposited, then connecting the deposited metal element of the ceramic and the metal material together via the metal layer.

On the opposite side of the diaphragm 4, the clamping member 3 is superimposed. By fastening the fixing member 10, the diaphragm 4 is clamped and fixed, while keeping airtight the gas container with the clamping member 3 and the clamp surface 234; thereby the diaphragm 4 separates the valve chamber 23 and the inner space 211 of the cylindrical portion 21 in an airtight manner. In the center of the clamping member 3, a valve controlling member 5 is stored; between the valve controlling member 5 and the clamping member 3, a spring 51 is inserted. The spring 51 energizes the valve controlling member 5 in a direction far from the valve seat 231.

The lower end of the valve controlling member 5 is arranged to be convex spherical and urged against the center portion of the diaphragm 4. While, the top end portion 52 of the valve controlling member 5 is penetrated through the fixing member 10 to be connected to the controlling means 9. In a condition that the fixing member 10 fastens the diaphragm 4, the top end of the fixing member 10 is protruded to the above from the valve body 2; the protruded end portion is fixed to an air actuator by means of a nut 102 screwed thereon.

The constitution of the controlling means 9 will be explained below. The air actuator 6 as a controlling means comprises a casing wherein a first piston 94, a pressure plate 95, a second piston 96 and a coned disc spring 97 are stored. The casing is constituted of a bottom plate 91, a cylindrical member 92 which constitutes a side wall of the casing, and a cover member 93 being fit to an upper opening of the cylindrical member 92. The bottom plate 91 is clamped and fixed to the cylindrical portion 21 of the value body 2 by means of a nut 102 thereby the valve body 21 and the air actuator 9 are fixed together as a united body.

The first piston 94 is contained in the casing being slidable with respect to the inner wall of the cylindrical member 92 while keeping the airtight thereof. A piston rod 901 is formed in the center of the first piston as a united body. The lower end of the piston rod 901 is urged against the top end portion 52 of the valve controlling member 5, while the upper end thereof is urged against the second piston 96.

Between the second piston 96 and the cover member 93, said coned disc spring 97 is inserted to energize the valve controlling member 5 in a lower direction via the piston rod 901. Between the bottom plate 91 and the first piston 94, a first chamber 90a is formed, and between the pressure-plate 95 and the a second piston 96, a second chamber 90b is provided, respectively. The first chamber 90a and the second chamber 90b are connected together by means of a path 902 formed in the piston rod 901.

Next, the function of the above-mentioned air actuator 9 will be explained. In order to open the control valve 1, an operating medium (air), for instance, a compressed air, is introduced into the first chamber 90a; thereby the first piston 94 and the second piston 95 are pushed up against the energizing power of the coned disc spring 97; the valve controlling member 5 goes up by the energizing power of the spring 51; the diaphragm 4 is separated from the valve seat 231 by the pressure of a gas; then the control valve 1 becomes open. On the other hand, in order to close the control valve 1, the operating medium supply is stopped and the path 90a to the first chamber 90a is opened to decrease the air pressure in the chambers 90a and 90b; by the energizing power of the coned disc spring 97 the valve controlling member 5 is pushed down, so that the urging member 41 of the diaphragm 4 closes the opening 252 of the valve seat 231, then the control valve 1 is closed.

Figure 2:
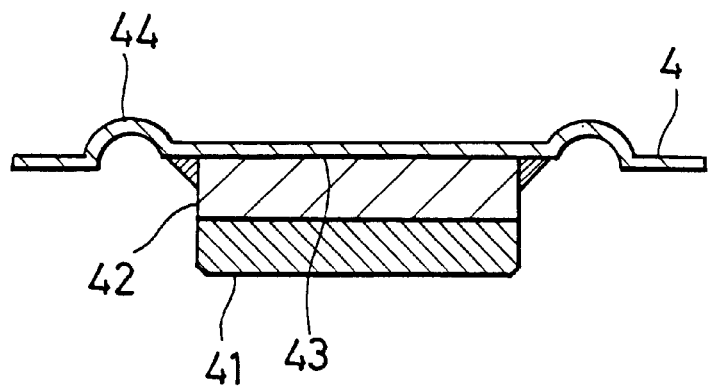
FIG. 2 is a cross-sectional view illustrating a construction of the diaphragm as a whole according to the present invention.

The construction of the diaphragm 4 will be explained below. As shown in FIG. 2, a metal inserting member 42 is provided between the urging member 41 and the diaphragm 4. By the existence of the inserting member 42, it becomes easy to bond the inserting member 42 and the urging member 41 and to weld the diaphragm 4 made of a thin metal material and the inserting member 42; then it becomes easy to connect the diaphragm 4 and the urging member 41 so that the connecting strength therebetween is improved. The welding of the inserting member 42 and the diaphragm 4 may be carried out such that the surface where the inserting member 42 and the diaphragm 4 are made contact together is welded with the aid of a laser beam being made incident upon the rear side of the diaphragm, in addition to the welding as shown in the FIG. 2, where the inserting member 42 is welded to the diaphragm 4 at the peripheral portion thereof.

As shown in FIG. 2, the diaphragm 4 comprises a flexible portion 44, which carries the flexure thereof. This flexible portion 44 restricts the deformation of the bonded portion 43 at which the rigid body, i.e. the urging member 41 or the inserting member 42, is connected, so that the displacement amount caused by the flexure of the diaphragm 4 as a whole is carried by the flexibility of the flexible portion 44. Such a flexible portion 44 is provided around the flat bonded portion 43 positioned in the central portion of the diaphragm 4. The flexible portion 44 has an arc shape convex toward one side of the surface of the diaphragm 4 viewed from the direction where the diaphragm 4 is cut in its radial direction. When the diaphragm 4 is bent in a perpendicular direction with respect to its surface (the diaphragm is elastically deformed), the arc shape of the flexible portion 44 becomes wider (or narrower) so as to carry the deformation of the diaphragm 4. By the deformation of the flexible portion 44 in such a manner, the deformation of the bonded portion 43 is restricted to the minimum so that the lifetime of the diaphragm itself becomes longer.

Figure 3:
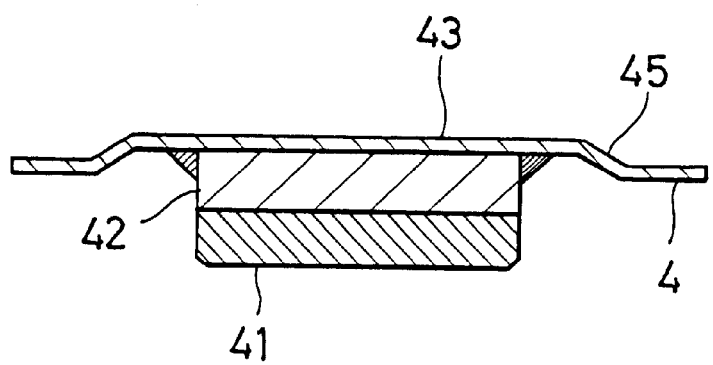
FIG. 3 is a cross-sectional view representing another construction of the diaphragm as a whole according to the present invention.
Figure 4:
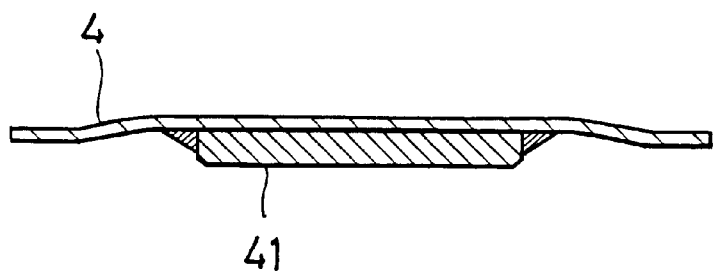
FIG. 4 is a cross-sectional view depicting still another construction of the diaphragm as a whole according to the present invention.

The flexible portion 44 may have another shape, such as a wave shape, a bellows shape, or a step shape(or a slope shape) 45 as shown in FIG. 3, in addition to the arc shape viewed from the cross-sectional direction. Further, the flexible portion 44 may have such a structure that the elastic coefficient thereof is relatively smaller than the other part, or that the rigidity of the flexible portion 44 is relatively smaller than the other parts, for instance, the bonded portion 43 or the clamped portion 46 positioned at the peripheral portion of the diaphragm. Such a construction can be obtained by sintering the diaphragm partially (for instance, sintering the bonded portion 43 or the clamped portion 46). In addition to the embodiments explained above, it may be possible to arrange such that the diaphragm 4 is directly bonded to the urging member 41 without providing the inserting member 42.

It may also be possible to make one of the sides, where the diaphragm is bonded, of the urging member 41 (inserting member 42, if any) spherical so as to make the shape of the side suit to the deformed shape of the diaphragm 4, in other words, to make the shape along the deformed shape of the diaphragm 4. By such an arrangement, the stress concentration generated on the diaphragm can be reduced and the deterioration of the diaphragm 4 can be prevented.

Figure 5:
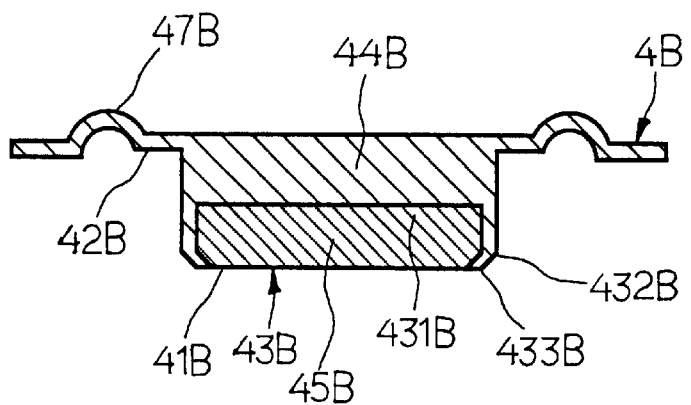
FIG. 5 is a cross-sectional view showing still another construction of the diaphragm as a whole according to the present invention.

An alternative construction may be applied to the components of the control valve 1, i.e. a diaphragm 4, an urging member 41 and an inserting member 42. FIG. 5 shows the alternative construction where a diaphragm 4B comprises a disc-shaped thin portion 42B and a holding portion 43B being provided in a center of said thin portion 42B. The holding portion 43B is arranged as a single united body to the thin portion 42B and comprises a bottom portion 44B, which is thicker than the thin portion 42B, and a containing portion 45B for containing an urging member 41B inside.

The thin portion 42B and the holding portion 43B are arranged as a single united body, which constitutes the diaphragm 4B. In other words, a single united body having a holding portion 43B at a center and a thin portion 42B at a peripheral portion can be obtained by grinding or rolling the circumference end of a material having a cylindrical shape.

The containing portion 45B includes a concave portion 431B having a cylindrical shape and an outer portion 432B which covers the urging member 41B contained therein from the outside; the urging member 41B is contained in the concave portion 431B being held by the outer portion 432B. An opening end 433B of the outer portion 432B is deformed from outside to inside at the urging member 41B contained in the concave 431B, so that the urging member 41B is held in the concave portion 431B in a fixed manner.

In order to fix the urging member 41B to the diaphragm 4B, a welding or an adhering is generally used. However, in this embodiment, the urging member 41B is mechanically fixed to the diaphragm 4B with the aid of the deformation of the outer portion 432B. Therefore, the structure to hold the urging member 41B is apt not to be influenced by the deformation of the diaphragm 4B or the corrosive atmosphere surrounding the diaphragm, so that a higher fixing strength for holding the urging member 41B can be obtained.

Figure 6:
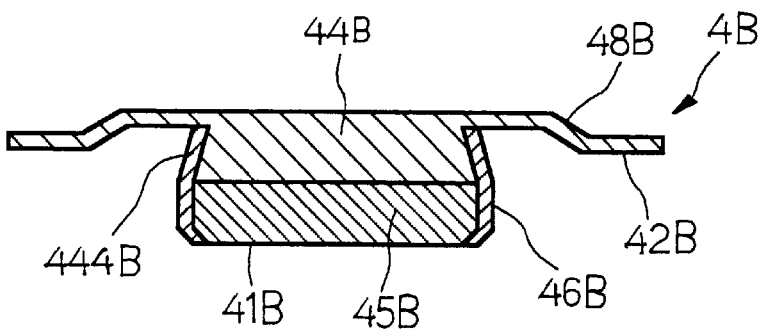
FIG. 6 is a cross-sectional view illustrating still another construction of the diaphragm as a whole according to the present invention.

In addition to the above-mentioned construction where the outer portion 432B totally covers the outer surface of the urging member 41B, such an alternative may be used that the urging member 41B is supported by the outer portion on at least three points. Furthermore, it may be possible to use a separate member for the outer portion 432B, as shown in FIG. 6. According to this alternative construction, a tapered portion 441B is formed on the outer surface of the thick bottom portion 44B of the holding portion 43B; an outer member 46B having a cylindrical shape is attached to cover the bottom portion 44B, and then pressure is added to the outer member 46B from outside to deform it toward an inside to fix the urging member 41B to the bottom portion 44B.

In addition, since the diaphragm 4B has a thick bottom portion 44B, the possibility in processing the diaphragm becomes broader, so that it becomes possible to provide works, such as screw holes, etc. in the bottom portion 44B. Thus, the designing possibility of a control valve using this type of diaphragm becomes broader.

The conventional adhering method using an adhering agent can also be used to fix the urging member 41B to the diaphragm 4B. Due to the fact that since the contact surface of the urging member 41B and the diaphragm 4B is covered with the outer portion 432B, the contact surface is not apt to be effected by the corrosive gas and since the urging member 41B is made to contact to the thick portion of the diaphragm 4B, the elastic deformation of the contact portion thereof is small, the adhering strength in making the urging member 41B to contact the diaphragm 4B is improved.

Furthermore, it may be possible to provide a flexible portion 47B to carry the flexure thereof, as shown in FIG. 5. By the flexible portion 47B, the stress concentration generated on the border between the holding portion 43B and the thin portion 42B is reduced, and most of the deformation caused by the flexure of the diaphragm 4B as a whole is carried by the flexible portion 47B. In case that the diaphragm 4B is flexed in a perpendicular direction with respect to the surface of the diaphragm 4B (elastic deformation), the arc portion of the flexible portion 47B expands (or becomes narrower) so that the flexible portion 47B carries most of the deformation of the diaphragm 4B. The flexible portion 47B may have another shape, such as a wave shape, a bellows shape, or a step shape(or a slope shape) 48B as shown in FIG. 6, in addition to the arc shape viewed from the cross-sectional direction as shown in FIG. 5.

Figure 7:
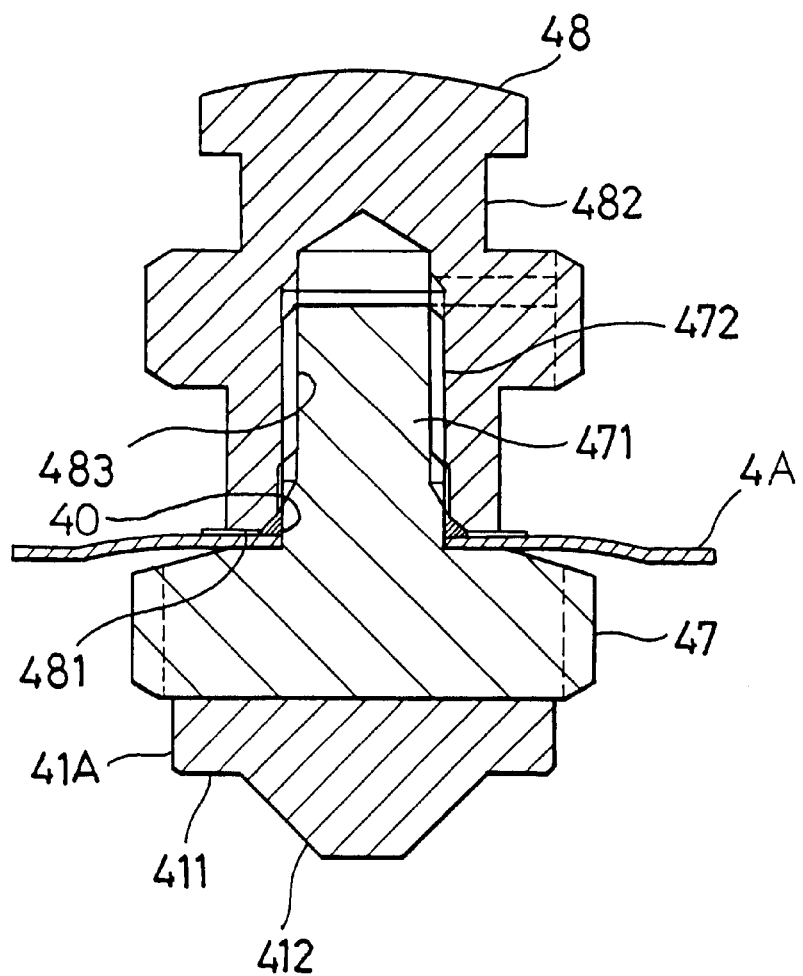
FIG. 7 is a cross sectional view representing still another construction of the diaphragm as a whole according to the present invention.

While, it may be possible to provide an urging member 41 having another shape. For instance, as shown in FIG. 7, a taper 412 may be formed in the center of the urging surface 411 of the urging member 41A, so that the tapered surface is made contact to the periphery of the opening 252 of the valve seat 231 to close the opening 252. According to such a construction, the airtight condition between the urging member 41 and the valve seat 231 can be improved. Further, since the seal member 232 and the exchanges thereof become unnecessary, it becomes easier to maintain the control valve.

Figure 8:
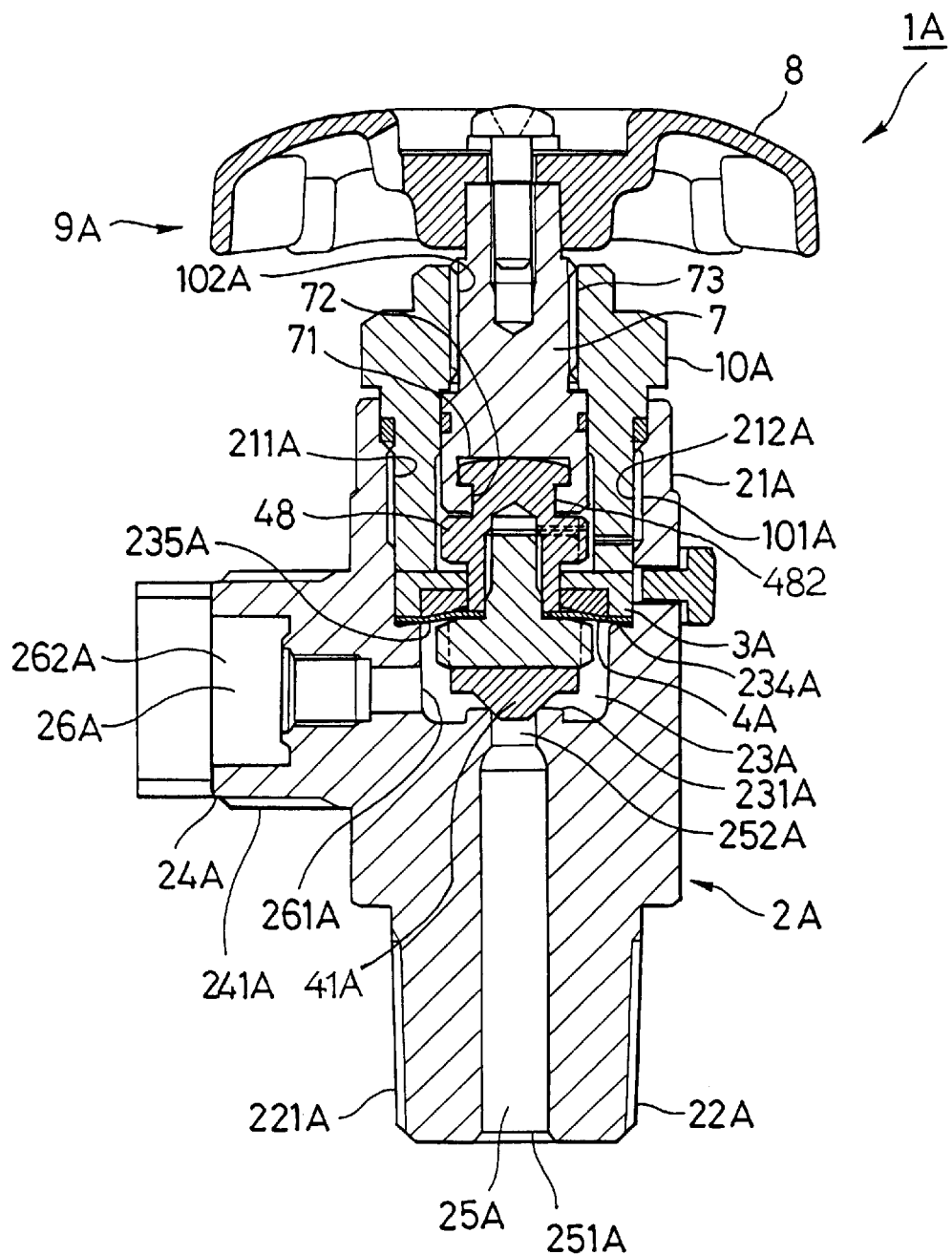
FIG. 8 is a cross-sectional view depicting a construction of the control valve as a whole according to the second embodiment of the present invention.

Such an urging member 41A is bonded to a pressure-member 47 made of metal by the above mentioned method. In the pressure member 47, is provided a bolt portion in the center of the surface, opposite to the surface where the urging member 41A is bonded. The bolt portion 471 penetrates through the hole 40 formed in the center portion of the diaphragm 4; the diaphragm 4 is fixed to the bottom of the bolt portion 471 by means of welding in an airtight manner. To a male thread 472 formed on the bolt portion 471, fits a female thread 481 of a connecting member 48. The top end portion 481 of the connecting member 48 is urged against the surface of the diaphragm 4 so that the diaphragm 4 is held and fixed between the connecting member 48 and the urging member 47 in an airtight manner. On the bottom end portion of the connecting member 48, a groove 482 is formed in a circumference direction. To this groove 482, a controlling means such as an air actuator and a manual type switching device is connected. FIG. 8 is a side view of the control valve 1A as a whole according to the second embodiment of the present invention, where a manual type switching device is used as the controlling means.

The control valve 1A comprises a valve body 2A, a clamping member 3A, which is provided in the cylindrical portion 21A of the valve body 2A, a diaphragm 4A, a controlling means 9A for controlling the connecting member 48 of the diaphragm 4A in an advance or retreat direction. In the second embodiment, the controlling means 9A is arranged as a manual switching means.

The valve body 2A according to the second embodiment has almost the same constitution to that of the first embodiment. The valve body 2 comprises a fixing portion 22A, a valve chamber 23A having a valve seat 231A, a cylindrical portion 21A whose inner air space 211A is connected to the valve chamber 23A, a connecting portion 24A having an outlet 262A at its top end portion, a gas current in path 25A and a gas current out path 26A. The fixing portion 22A has one of the openings 251A of the gas inlet path 25A at the top end and has a male screw thread 221A on its outer circumstance thereof.

In the center of the valve seat 231A of the valve chamber 23A, the other opening 252A of the gas current in path 25A is provided. Further, one of the openings 261A of the gas current out path 26A is provided in the valve chamber 23A.

At the peripheral portion of the opening of the valve chamber 23A, a step is formed to provide a clamping surface 234A in a concentric manner in order to clamp and fix the peripheral portion of the diaphragm 4A thereto. On the upper side of the clamp surface 234A, a cylindrical portion 21A is formed into which the clamping member 3A is threaded. The inner space 211A of the cylindrical portion 21A is connected to the valve chamber 23A via an opening 235A which is surrounded by the clamping surface 234A. Into the inner space 211A, the clamping member 10A is threaded. On the inner surface of the cylindrical member 21A, a female thread 212A is formed. The clamping member 10A of the controlling means 9A clamps the diaphragm 4A via the clamping member 3A.

The connecting portion 24A formed on the outer surface of the valve body 2A has a cylindrical shape on the surface of which a male thread 241A is formed. On the top end of the connecting portion 24A, is provided another opening 262A of the gas current out path 26A. To the connecting portion 24A, a terminal of the gas current path, such as a gas tube, is connected. The fixing member 10A has a cylindrical shape, on the outer surface of which a male thread 101A to be fixed to the female thread 212A is formed, and in which the connecting member 7 and the connecting member 48 are contained.

On the lower end of the connecting member 7, a hole 71 is formed. In the opening of the hole 71, a convex portion 72 is formed to be connected to a groove 482 of the connecting member 48. By means of the connection of the convex portion 72 and the groove 482, the connecting member 7 moves the connecting member 48 back and forth in an axial direction, while rotating itself. To the back end of the connecting member 7, a handle 8 is connected as a single unit so as to be rotatable. Further, on the outer circumstantial surface of the back end of the connecting member 7, a male thread 73 is formed which fixes to the female thread 102A formed on the inner surface of the fixing member 10A.

In the construction mentioned above, by manually rotating the handle 8, the connecting member 7 is rotated: the female thread 102A and the male thread 73 are fixed together to move the connecting member 7 in the axial direction, then the urging member 41A is moved in the axial direction via the connecting member 48. During when the urging member 41A moves, the diaphragm 4A is elastically deformed while keeping the airtight there; the urging member 41A is urged against the opening 252A of the gas current in path 25A to interrupt or release the current of gas.

Figure 9:
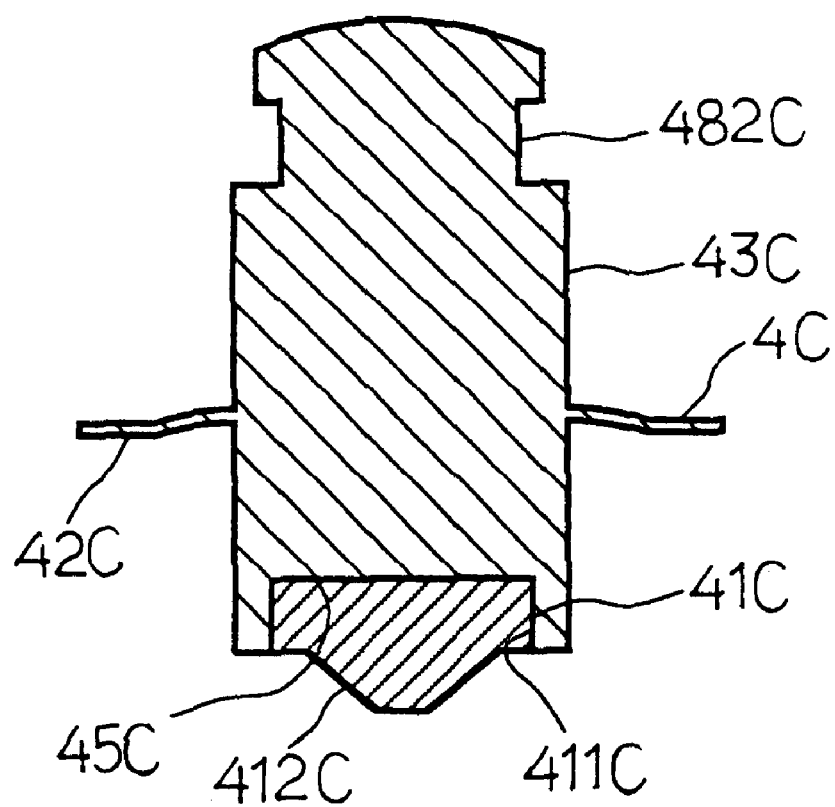
FIG. 9 is a cross-sectional view showing a construction of the diaphragm which can be suitably used with the control valve depicted in FIG. 8.

Another construction of the diaphragm 4A, the urging member 41 and the connecting member 48 may be applied to the control valve shown in FIG. 8. As shown in FIG. 9, the diaphragm 4C comprises a disc-shape thin portion 42C, and a cylindrical-shape body 43C at a center of the thin portion 42C, which are arranged to be a single united body to the thin portion 42C. The body 43C has a containing portion 45C for containing the urging member 41C at an end portion thereof, and a groove 482 C for being connected to the operating means which is formed in a circumference direction at another end portion of the body.

The single united body of the body 43C and the thin portion 42C can be obtained by grinding a cylindrical-shape material. The urging member 41C has a protruded portion at a center thereof; the protruded portion has a tapered surface 421C, which is to be urged against the periphery of the opening 252 of the valve seat 231. Due to the existence of the tapered surface 412C, the opening 252 is certainly closed with a smaller urging force.

According to the first aspect of the present invention, the urging member being made in contact to the gas, is made of a material having a resistance to corrosion so that the durability of the control valve is improved.

Further, according to the second aspect of the present invention, the urging member is made of a ceramic material so that the durability of the control valve is more improved and the lifetime of the valve becomes longer.

Furthermore, according to the third aspect of the present invention, the diaphragm has a flexible portion, so that the stress concentration, which is caused on the diaphragm on which a ceramic, rigid body, is bonded, is reduced and therefore the durability of the diaphragm, in its turn the control valve is improved.

Moreover, according to the fourth aspect of the present invention, such a ceramic member is used for the member to be fixed to the diaphragm, the durability of the diaphragm is improved.

Moreover, according to the fifth aspect of the present invention, a flexible portion is formed in the thin plate member so that the stress concentration, which is cause on the diaphragm on which a rigid body, i.e. ceramic, is bonded, is restricted and therefore the durability of the diaphragm can be improved.

According to the sixth aspect of the present invention, the thin plate member and the ceramic member can easily be bonded together by providing the inserting member therebetween; then the connection between the thin plate member and the ceramic member can be secured.

According to the seventh aspect of the present invention, since the thin portion and the holding portion of the diaphragm are formed as a single united body and thus made of the same material, a stress concentration is not apt to be caused on a border between the holding portion and the thin portion, and thus cracking is not apt to be generated.

According to the eighth aspect of the present invention, on the tapered surface provided on the ceramic member ensures airtightness on the opening of the valve seat.

According to the ninth aspect of the present invention, the number of parts of the diaphragm can be made smaller. Further, an arbitrary shape of the connecting portion to be connected to the operating means can be obtained by processing the cylindrical-shape body, so that the general-purpose properties of the diaphragm becomes greater, more concretely, the diaphragm can generally be applied to many different kinds of control valve.

What is claimed is:

1. A control valve for use with a corrosive gas, comprising a thin plate diaphragm member;

a closure member made of ceramic for closing against a valve seat;

a holding portion being formed at a center of and extending perpendicularly from the thin plate diaphragm member as a single united body with said thin plate diaphragm member;

the thin plate diaphragm member having a flexible portion located radially outward of a center bonding region, wherein a degree of flexure of the flexible portion is relatively greater than that of the thin plate diaphragm member at the bonding region; and wherein the closure member is held in said holding portion and has a resistance to corrosion, a surface of the closure member being exposed to a valve seat side of the control valve.

2. A control valve according to claim 1, wherein said holding portion is deformable, and said closure member is held in the holding portion.

3. The control valve of claim 1, wherein the holding portion extends perpendicularly towards the valve seat side to retain the closure member therein.

4. The control valve according to claim 3, wherein the holding portion has a free end away from the valve seat side surface of the thin plate diaphragm member, and wherein the free end is deformed in a direction toward a radial center of the cavity to thereby retain the closure member against movement in a direction away from the valve seat side surface of the thin plate diaphragm member relative to the holding portion.

5. The control valve of claim 3, wherein the holding portion is formed as a hollow extension and forms a cavity defined by a valve seat side surface of the thin plate diaphragm member and an inner surface of the holding portion, to retain the closure member conformingly within the cavity.

6. The control valve of claim 5, wherein the closure member is retained within the cavity such that only a single surface facing the valve seat side is exposed.

* * * * *